Patented Aug. 14, 1928.

1,681,077

UNITED STATES PATENT OFFICE.

ALOIS ZINKE AND KONRAD FUNKE, OF GRAZ, AUSTRIA, ASSIGNORS TO FELICE BENSA, OF GENOA, ITALY.

MANUFACTURE OF HIGHLY-CHLORINATED PERYLENES.

No Drawing. Application filed June 7, 1927, Serial No. 197,229, and in Austria April 2, 1927.

In the processes hitherto proposed for manufacturing chlorine derivatives of perylene it was proposed amongst others to introduce dry chlorine gas into a suspension of perylene.

The fact that perylene suspensions are dealt with renders difficult to such an extent the manufacture of predetermined products that the results of the reaction are only difficultly reproducible. Besides it is found that in this way only the known hexachloroperylene can be arrived at, on continuing the introduction of chlorine a decomposition of the perylene nuclein takes place.

The object of the present invention is the manufacture of highly chlorinated perylenes, that is to say of hepta-up to dodekachloroperylene. This object is obtained according to the invention by adding to the solution or suspension of perylene a chlorine transferring agent which may be chloride of a metal such as aluminium chloride or the chloride of a so called semimetal such as pentachloride of antimony. One then succeeds in obtaining hepta-to dodekachloroperylene according to the temperature and the quantity of the chlorine caused to flow through the suspension or solution of perylene.

Example I.

Through a suspension of 1 part by weight of perylene in 50 parts by weight of nitrobenzene to which 1.5 parts by weight of finely powdered anhydrous aluminium chloride are added a current of dried chlorine gas is caused to flow during 2½ to 3 hours at room temperature. At the end of the reaction the liquid turns violet. The mass is further treated by shaking it with cold water, the aqueous part is separated from the nitrobenzene part and the already crystallized reaction product contained in the latter part is separated by filtration. For purifying, it is recrystallized preferably from nitrobenzene or aniline whereby the compound is obtained in reddish brown crystals. The new compound is insoluble in alcohol, ether, benzene and similar solvents boiling at a low temperature but it dissolves rather easily in boiling nitrobenzene and aniline. On heating the compound up to 360° centigrade a melting point could not be found. Analysis gave a chlorine content of 53.54%.

Example II.

1 part by weight of perylene is divided in 30 parts by weight of nitrobenzene and through the liquid to which 1.5 parts by weight of chloride of aluminium have been added a current of washed and dried chlorine gas is caused to pass during 3 hours at a temperature of 130 to 140° centigrade. After the mass has been left to stand for about 12 hours the deposit having separated in crystals is filtered off and thoroughly washed with hot water containing hydrochloric acid. The compound can be purified by recrystallization from nitrobenzene whereby it is obtained in brownish yellow lanceolar crystals. The compound is insoluble in solvents having a low boiling temperature such as ether, alcohol, acetone, benzol, but is rather easily soluble in boiling nitrobenzene and aniline. Up to 360° centigrade it does not show a melting point and is even insoluble in concentrated sulphuric acid in the cold. In fuming sulphuric acid containing 25% of anhydride the compound dissolves with a pure emerald green colour. The chlorine content is according to analysis 56.16% corresponding to a nono chloroperylene.

If all other things being equal, the speed of flow of the chlorine gas is increased a deka chloroperylene is obtained for the chlorine content is according to analysis 59.67%.

Example III.

1 part by weight of perylene in 30 parts by weight of dry nitrobenzene is mixed with 1.5 parts by weight of pentachloride of antimony and through the liquid heated to a temperature of 100 to 120° centigrade a vigorous current of chlorine gas is caused to flow during 2 hours. The mass is further treated by filtering off the product crystallized after cooling and purifying it by recrystallization from nitrobenzene. One obtains orange lanceolar crystals insoluble in cold concentrated sulphuric acid and soluble in fuming sulphuric acid containing 25% of anhydride with an emerald green colour. The substance is insoluble in solvents having a low boiling temperature but soluble in boiling nitrobenzene and aniline. Up to 360° it does not show a melting point and contains, as is found by analysis 63.28% of chlorine.

What we claim is:

1. A process for manufacturing highly chlorinated perylenes, that is say hepta-to dodeka chloroperylenes consisting in intimately mixing an inert liquid solvent, perylene and an inorganic chloride adapted to act as a chlorine transferring agent and passing through such mixture a current of dry gaseous chlorine.

2. A process for manufacturing highly chlorinated perylenes, that is to say hepta- to dodeka chloroperylenes consisting in intimately mixing an inert liquid solvent, perylene and an inorganic chloride adapted to act as a chlorine transferring agent, such chlorine transferring agent being not less than once and not more than twice the weight of the said perylene and passing through such mixture a current of dry gaseous chlorine.

3. A process for manufacturing highly chlorinated perylenes, that is to say hepta- to dodeka chloroperylenes consisting in intimately mixing an inert liquid solvent, perylene and an inorganic chloride adapted to act as a chlorine transferring agent heating the mixture to a temperature not higher than 175° centigrade and passing through such mixture a current of dry gaseous chlorine.

4. A process for manufacturing highly chlorinated perylenes, that is to say hepta- to dodeka chloroperylenes consisting in intimately mixing an inert liquid solvent, perylene and pentachloride of antimony not less than once and not more than twice the weight of the said perylene heating the mixture to a temperature not higher than 175° centigrade and passing through such mixture a current of dry gaseous chlorine.

5. As a new article of manufacture chloroperylenes containing more than six atoms of chlorine.

In testimony whereof we have affixed our signatures.

ALOIS ZINKE.
KONRAD FUNKE.